United States Patent [19]
Clevenger et al.

[11] Patent Number: 5,557,081
[45] Date of Patent: Sep. 17, 1996

[54] VEHICLE LAMP SLIDE SWITCH INCLUDING DETENT ASSEMBLY

[75] Inventors: Marc C. Clevenger, Zeeland; Mathias R. Fox, Holland, both of Mich.

[73] Assignee: Prince Corporation, Holland, Mich.

[21] Appl. No.: 338,335

[22] Filed: Nov. 14, 1994

[51] Int. Cl.⁶ .................................................. H01H 15/02
[52] U.S. Cl. ........................................ 200/16 C; 200/548
[58] Field of Search ................................ 200/11 J, 11 K, 200/16 C, 16 D, 61.52, 61.62, 61.76–61.82, 61.83, DIG. 29, 548; 362/802

[56] References Cited

U.S. PATENT DOCUMENTS

| | | | |
|---|---|---|---|
| 1,799,920 | 4/1931 | Meuer | 200/16 C X |
| 2,182,937 | 12/1939 | Batcheller | 200/550 |
| 2,246,373 | 6/1941 | Lodge | 200/16 C |
| 3,024,334 | 3/1962 | Rhodes | 200/11 K X |
| 3,187,119 | 6/1965 | Dyksterhouse | 200/16 C |
| 3,197,579 | 7/1965 | Romney | 200/11 K X |
| 3,294,929 | 12/1966 | Johnson | 200/11 K X |
| 3,319,016 | 5/1967 | Hoy et al. | 200/16 C |
| 3,355,565 | 11/1967 | Daul | 200/548 |
| 3,378,654 | 4/1968 | Hoy et al. | 200/16 C |
| 3,757,060 | 9/1973 | Ianuzzi et al. | 200/16 C |
| 3,857,000 | 12/1974 | Boulanger | 200/16 D |
| 4,152,565 | 5/1979 | Rose | 200/542 |
| 4,251,698 | 2/1981 | Raab et al. | 200/16 C X |
| 4,631,377 | 12/1986 | Imazeki et al. | 200/16 F X |
| 4,670,630 | 6/1987 | Kikta et al. | 200/16 C |
| 5,051,549 | 9/1991 | Takano | 200/16 C |
| 5,345,372 | 9/1994 | Takano et al. | 20/16 C X |

Primary Examiner—J. R. Scott
Attorney, Agent, or Firm—Price, Heneveld, Cooper, DeWitt & Litton

[57] ABSTRACT

A vehicle lamp assembly switch includes a housing having a floor and electrical conductors mounted to the floor and defining a pair of spaced apart electrical switch contacts. The contacts define a guide track for receiving a movable contact element which in the preferred embodiment comprises a spherical conductive member. In a preferred embodiment of the invention, the housing floor further includes detent structure which cooperates with a control member for providing a plurality of detented switch positions.

39 Claims, 2 Drawing Sheets

VEHICLE LAMP SLIDE SWITCH INCLUDING DETENT ASSEMBLY

BACKGROUND OF THE INVENTION

The present invention relates to an electrical switch for use in connection with a vehicle lamp assembly.

Vehicle overhead lamp assemblies have, in the past, typically used push button switches which comprise discrete components which must be mounted in some fashion to the lamp housing. Such switches are packaged to include electrical wiring which must be attached to the remaining electrical circuit components such as lamp sockets of the lamp. It is desired to replace the use of the discreet switches requiring separate wire connections and lamp sockets with a circuit stamped to include lamp sockets and switch structure in order to provide a reliable and yet relatively inexpensive switch and lamp assembly which can be employed with the vehicle for dome or other vehicle interior lighting applications.

SUMMARY OF THE PRESENT INVENTION

The vehicle lamp assembly of the present invention satisfies the need for a less expensive and yet highly reliable lamp assembly which includes a unique switch for controlling the operation of the application of electrical operating power to a lamp associated with the assembly.

Lamp assemblies embodying the present invention include a housing having a floor and electrical conductors mounted to said floor and defining a pair of spaced apart electrical switch contacts. The contacts define a guide track for receiving a movable contact element which in the preferred embodiment comprises a spherical conductive member. In a preferred embodiment of the invention, the housing floor further includes detent structure which cooperates with a control member for providing a plurality of switch positions.

The control member of the preferred embodiment of the invention includes a movable slide for positioning the spherical contact member in said guide track of said contacts and a second spherical spring loaded member in contact with said detent structure of said floor for guidably moving said slide between different switch positions. These and other features, objects, and advantages of the present invention will become apparent upon reading the following description thereof together with reference to the accompanying drawings in which:

DETAILED DESCRIPTION OF THE PREFERRED EMBODIMENT

Figure 1:
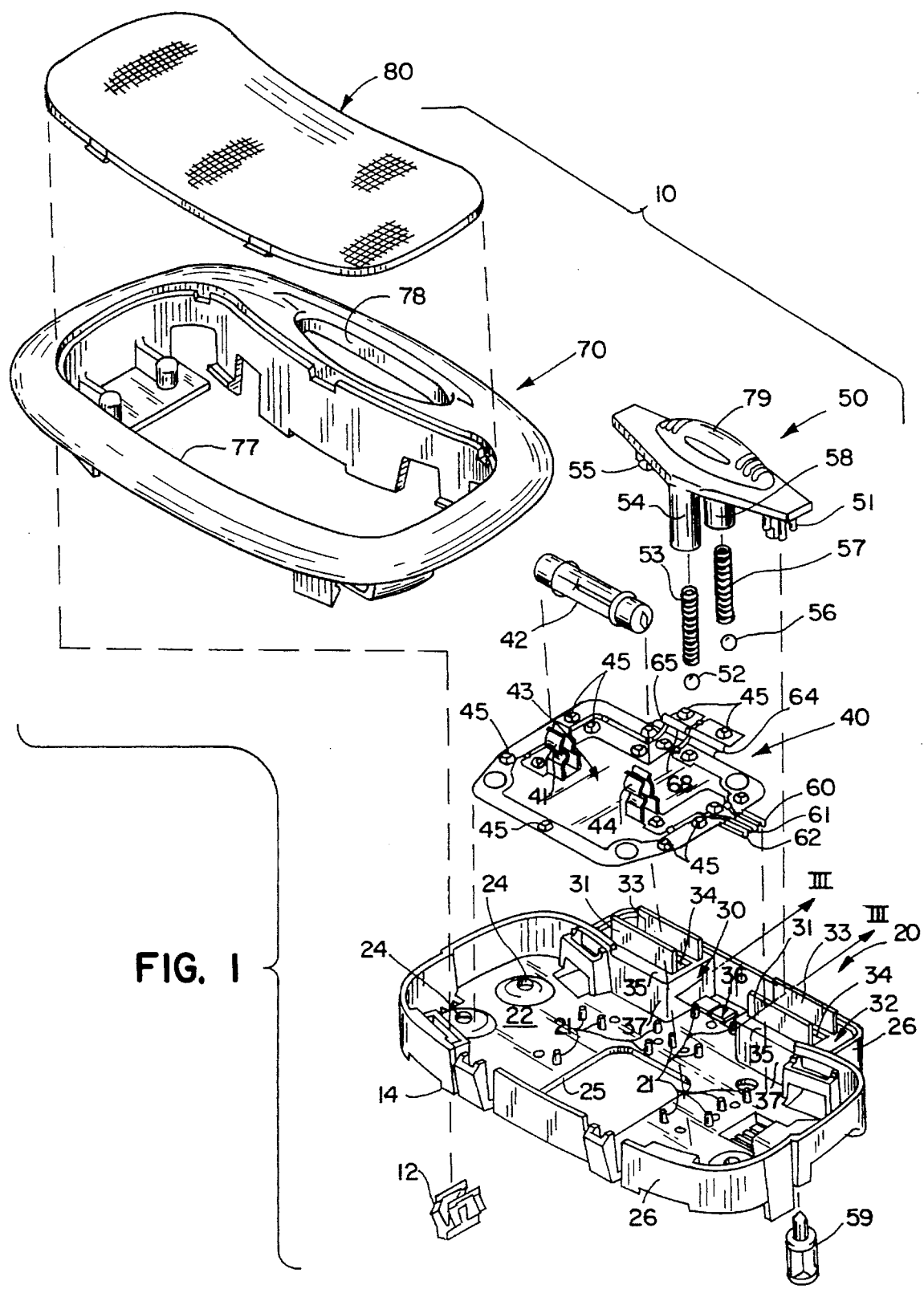
FIG. 1 is an exploded view of a lamp assembly embodying the present invention.

Referring initially to FIG. 1 there is shown a lamp assembly 10 embodying the present invention which includes a housing 20 to which a stamped electrical circuit 40 is mounted. Assembly 10 further includes a lamp 42 which extends within a lamp socket 43 of circuit 40 defined by spring clips 41 and 44. A sliding switch control 50 is slidably mounted to the housing 20 and mounts and controls the movable switch contact and guide elements as described in detail below. The assembly 10 is completed by a trim bezel 70 and a snap-in lens 80.

The housing 20 is integrally molded of a suitable polymeric material such as polycarbonate and includes a floor 22 with a plurality of spaced upwardly extending projections 21 which extend through apertures 45 formed in the stamped electrical circuit 40 for attaching the circuit to the floor 22 of housing 20. Once the circuit is positioned over the projections, they are heat staked to securely mount the circuit in fixed relationship to the housing. Housing 20 also includes a plurality of apertures 24 for receiving fastening screws for attaching the housing to the supporting roof structure of a vehicle, although mounting clips 12 secured to tabs 14 on the peripheral sidewall 26 of the housing could also be used for such purpose. It is noted in FIG. 1 the lamp assembly is shown in an inverted position. Once installed in a vehicle, the bottom surface of floor 22 faces the vehicle roof while the lens 80 faces the interior of the vehicle.

Housing 20 includes an aperture 25 providing an opening behind lamp 42 such that the lamp does not come into immediate proximity of the floor 22 of the housing. Housing 20 also includes a pair of spaced guide members 30 and 32 which are substantially identical and which include vertically extending parallel spaced walls 31 and 33 and a generally rectangular aperture 34 through the raised floor section 35 supported by side wall 26 of the housing 20. L-shaped side walls 37 support floor 35 in conjunction with side wall 26 for each of the guide members 30 and 32 in spaced relationship above floor 22 of the housing. Between the ends of side walls 37 of each of the guide members 30 and 32 there is provided a detent structure 36 shown in greater detail in FIG. 3 and which cooperates with slide assembly 50 for providing detent positions for the switch so formed as described below.

Figure 2:
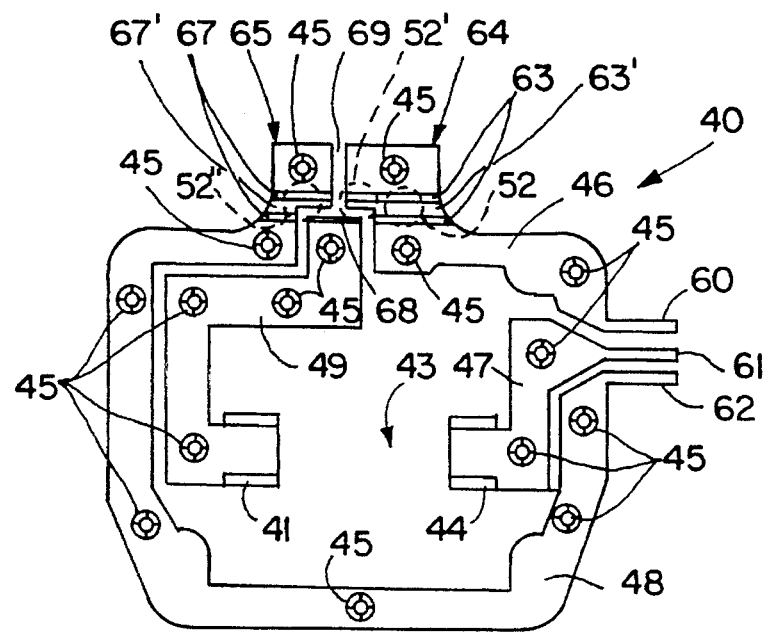
FIG. 2 is an enlarged plan view of the stamped electrical circuit shown in FIG. 1.
Figure 4:
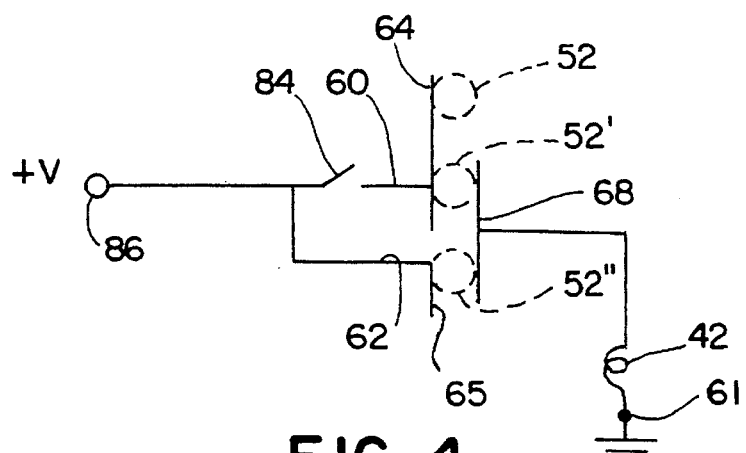
FIG. 4 is an electrical circuit diagram in schematic form of the lamp assembly of the present invention.

Circuit 40, as best seen in FIG. 2, includes four electrically separate stamped conductors 46, 47, 48, and 49. Conductor 46 terminates at one end in a terminal 60 which is coupled to the vehicles courtesy light switch 84 as seen in FIG. 4. The opposite end of the conductor 46 includes a pair of curved parallel spaced raised tracks 63 defining a trough 63' or guide therebetween defining a switch contact for captively receiving a movable switch contact defined by a spherical conductive movable switch element or ball 52 (FIG. 1). Ball 52 can be made of any suitable conductive material such as chromium plated steel. The length of tracks 63 permit the ball 52 to rest solely within trough therebetween with the switch in an "off" position which is the right most position indicated by arrow A in FIG. 1. Ball 52 is mounted to extend captively within a hollow cylindrical post 54 of switch slide 50 by means of a compression spring 53 which when slide 50 is mounted to the housing 20 compressibly urges the ball 52 into engagement with the electrical circuit 40. A second ball 56 is similarly mounted within a hollow cylindrical post 58 of switch slide 50 by means of compression spring 57 with ball 56 riding over the detent area 36 spaced toward the rear and behind trough 64 and the remaining terminals of the electrical circuit 40.

The second conductor 47 extends at one end to define the first bulb receiving spring clip 44 and at its opposite end to terminal 61 which is coupled to the vehicle ground as seen in FIG. 4. The third conductor 48 extends from terminal 62 around the periphery of the electrical circuit terminating in a switch contact 65 which like contact 64 includes a pair of raised guide tracks 67 with a trough 67' therebetween for receiving ball 52.

The remaining electrical conductor 49 defines lamp socket 41 at one end and terminates in a center contact 68 which is a single raised track aligned with the lower ones of tracks 63 and 67 in electrically spaced relationship therefrom and aligned to overlap the gap 69 between contacts 64 and 65 as best seen in the enlarged view of FIG. 2. The three fixed switch terminals thus define a segmented conductive guide track for ball 52 and provide three discreet positions at which the ball 52 selectively engages one or more of the contacts 64, 64 and 68, or 68 and 65 to selectively apply operating power to the lamp 42 from electrical supply conductors coupled to terminals 60, 61 and 63 as shown in FIG. 4. A suitable lubricating material such as Lubriplate can be applied to terminals 64, 65, and 68 to facilitate the sliding and\or rolling of ball 52 within the troughs defined by the raised tracks.

Figure 3:
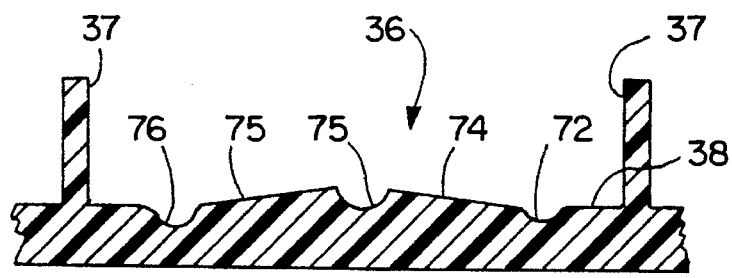
FIG. 3 is an enlarged cross-sectional view of a section of the housing floor taking along section lines III—III of FIG. 1.

While the electrical contact ball 52 selectively shorts various of the switch terminals to provide electrical operating power to the lamp, the control of the switch slide 50 is controlled by ball 56 which is spring loaded against the detent assembly 36 as shown in greater detail in FIG. 3. With the switch in its off position to the far right in a direction indicated by arrow A in FIG. 1, ball 56 rests in a semi-cylindrical detent 72 in the floor 38 of structure 36. Movement of the switch in a direction opposite arrow A causes the ball to ride up an inwardly inclined ramp 74 to a second detent 75 which corresponds to the normal position for the switch for operation of the lamp 42 by the courtesy switches controlled by the opening of the vehicle doors, for example. Movement of the switch 50 further in a direction opposite arrow A in FIG. 1 causes the ball 56 to ride down ramp 75 into a final semi-cylindrical detent 76 which corresponds to the light on position regardless of the opening or closing of a door. Thus, the detent structure 36 provides controlled motion of the switch slide 50 to accurately align detent positions which correspond to the positions of ball 52 in alignment with various of the terminals of the electrical circuit 40.

The slide 50 is mounted to the housing 20 with cylindrical posts 54 and 58 aligned to position ball 52 between the tracks and in the troughs or grooves formed by the fixed electrical contacts while ball 56 is aligned with the detent structure 36. The slide 50 is held in position by a pair of downwardly projecting posts 51 and 55 extending through apertures 34 in the floors 35 of guide members 30 and 32, respectively, and held in slidable position therein by means of a pair of fasteners 59 which can be snap-locked within the mounting posts 51 and 55 to secure the switch slide 50 to housing 20 for slidable operation in a the direction of arrow A and in an opposite direction for control of the switch.

Bezel 70 snap-fits over housing 20 and includes a central opening 77 for snap-receiving the lens 80 therein and an oval opening 78 for allowing the control surface 79 of switch slide 50 to extend there through for actuation by the vehicle operator.

In operation, as seen in FIG. 4, with the switch slide 50 in the off position, ball 52 is wholly within the guide defined by contact 64 and specifically between the spaced parallel raised tracks 63 defining the trough there- between. As the switch is moved in a direction opposite arrow A ball 52 moves downwardly (as viewed in FIG. 4) into a position 52' shown in FIG. 4 in which position the ball 52 is aligned within detent 75 detenting the shorting ball 52 to electrically contact 64 and center contact 68 thereby applying electrical operating power through a courtesy door switch 84 from the +V battery supply 86 of the vehicle to lamp 42 which has its remaining terminal 61 coupled to the system ground by means of conventional wiring. Typically a wiring plug will be provided to couple to contacts 60, 61 and 62 shown in FIGS. 1 and 2 to couple to vehicle's electrical system. With switch slide 50 moved to the extreme position opposite arrow A, shorting ball 52 moves to the position shown by 52" of FIG. 4 making contact between contacts 65 and 68 which applies power to lamp 42 regardless of the opening or closing of one of the door courtesy switches 84. In this position, the detent ball 56 is in recess 76 for holding the switch in an on position.

By mounting the contact ball 52 and guide ball 56 by compression springs 53 and 57 within cylindrical housings 54 and 58 of switch slide 50, a smooth operating guided switch control is provided in which the stamped electrical circuit provide the fixed switch contacts and the molded polymeric floor including the detent section 36 provides detents for the smooth operation of the switch so defined. It will become apparent to those skilled in the art that various modifications to the preferred embodiment can be made. For example, switch 50 may be a single pole single throw switch as opposed to a single pole double throw switch as in the preferred embodiment. Additional contact terminals can also be added by adding additional mechanical detents and spaced electrical contacts for the switch assembly so formed. These and other modifications to the preferred embodiment as described herein can be made by those skilled in the art without departing from the spirit or scope of the invention as defined by the appended claims.

The embodiments of the invention in which an exclusive property or privilege is claimed are defined as follows:

1. A switch for a vehicle lamp assembly comprising:

a housing having a lower floor defining a detent structure and a raised floor section defining bearing surfaces above the lower floor section;

at least a pair of conductors positioned on said lower floor and defining a pair of switch contacts, said switch contacts off-set from the detent structure and shaped to define tracks for receiving and supporting a movable contact element in direct contact only with said conductors for movement along said conductors; and a movable contact element and a control member movably coupled to said raised floor section of said housing along said bearing surfaces, said control member being configured to move said movable contact element along said tracks for selectively electrically coupling said switch contacts together, and further being configured to operably engage said detent structure to hold said control member in a selected position.

2. The switch as defined in claim 1 wherein said tracks comprise a pair of spaced parallel raised ridges defining a trough therebetween.

3. The switch as defined in claim 2 wherein said movable contact element comprises a conductive ball which has a diameter selected to allow said ball to move along said trough.

4. The switch as defined in claim 3 wherein said control member includes a ball retaining member for positioning said ball in alignment with said trough.

5. The switch as defined in claim 4 wherein said ball retaining member includes a spring for urging said ball into engagement with said switch contacts.

6. The switch as defined in claim 5 wherein said detent structure includes at least one depression in said floor to define a first switch position and wherein said control member includes a second ball retaining member, a second spring, and a second ball extending into engagement with said detent structure for providing a detent for said switch.

7. The switch as defined in claim 1 wherein three conductors are mounted to said floor to define three switch contacts.

8. The switch as defined in claim 7 wherein one of said switch contacts defines a track having a length for holding said moveable contact element therein when said control member is in a first position.

9. The switch as defined in claim 8 wherein a second one of said switch contacts defines in cooperation with said first switch contact tracks which receive said movable contact element when said control member is in a second position.

10. The switch as defined in claim 9 wherein a third one of said switch contacts defines in cooperation with said second switch contact tracks which receive said movable contact element when said control member is in a third position.

11. The switch as defined in claim 1 wherein said raised floor section includes portions located on opposite sides of said detent structure.

12. The switch as defined in claim 1 wherein said bearing surfaces include a guide slot.

13. The switch as defined in claim 1 including snap-locking fasteners for retaining said control member to said housing.

14. A switch for a vehicle lamp assembly comprising:

a housing having a lower floor defining a detent structure and a raised floor section defining bearing surfaces above the lower floor section;

at least three conductors positioned on said floor for defining three switch contacts, said switch contacts off-set from the detent structure and defined by tracks formed in said conductors for supporting a movable contact element in direct contact only with said conductors; and a movable contact element and a control member movably coupled to said raised floor section of said housing along said bearing surfaces, said control member being configured to move said movable contact element along said tracks for selectively electrically coupling said switch contacts together, and further being configured to operably engage said detent structure to hold said control member in a selected position.

15. The switch as defined in claim 14 wherein one of said switch contacts defines a track having a length for holding said moveable contact element therein when said control member is in a first position.

16. The switch as defined in claim 15 wherein a second one of said switch contacts defines in cooperation with said first switch contact tracks which receive said movable contact element when said control member is in a second position.

17. The switch as defined in claim 16 wherein a third one of said switch contacts defines in cooperation with said second switch contact tracks which receive said movable contact element when said control member is in a third position.

18. The switch as defined in claim 17 wherein said tracks comprise a pair of spaced parallel raised ridges defining a trough therebetween.

19. The switch as defined in claim 18 wherein said movable contact element comprises a conductive ball which has a diameter selected to allow said ball to move along said trough.

20. The switch as defined in claim 19 wherein said control member includes a ball retaining member for positioning said ball in alignment with said trough.

21. The switch as defined in claim 20 wherein said ball retaining member includes a spring for urging said ball into engagement with said switch contacts.

22. The switch as defined in claim 21 wherein said detent structure includes at least one depression in said floor to define a first switch position and wherein said control member includes a second ball retaining member, a second spring, and a second ball extending into engagement with said detent structure for providing a detent for said switch.

23. The switch as defined in claim 14 wherein said raised floor section includes portions located on opposite sides of said detent structure.

24. The switch as defined in claim 14 wherein said bearing surfaces include a guide slot.

25. The switch as defined in claim 14 including snap-locking fasteners for retaining said control member to said housing.

26. A vehicle lamp switch assembly comprising:

a housing having a lower floor defining a detent structure and a raised floor section defining bearing surfaces above the lower floor section;

at least a pair of stamped electrical conductors positioned on said floor and defining a pair of switch contacts, said switch contacts off-set from the detent structure and defined by elongated tracks formed in said conductors for receiving a movable contact element for lineal motion along said tracks;

a lamp having at least one terminal coupled to at least one of said conductors; and a movable electrical contact element and a control member movably coupled to said raised floor section of said housing along said bearing surfaces, said control member being configured to move said movable contact element along said tracks for direct contact and support only by said switch contacts on the side of said movable contact facing said lower floor for selectively electrically coupling said switch contacts together for applying electrical operating power to said lamp and further being configured to operably engage said detent structure to hold said contact member in a selected position.

27. The switch assembly as defined in claim 26 wherein said tracks comprise a pair of spaced parallel raised ridges defining a trough therebetween.

28. The switch assembly as defined in claim 27 wherein said movable contact element comprises a conductive ball which has a diameter selected to allow said ball to move continuously along said trough.

29. The switch assembly as defined in claim 26 and further including a lens and means for mounting said lens to said housing in spaced relationship to said lamp.

30. The switch assembly as defined in claim 29 wherein said control member includes a ball retaining member for positioning said ball in alignment with said trough.

31. The switch assembly as defined in claim 30 wherein said ball retaining member includes a spring for urging said ball into engagement with said switch contacts.

32. The switch assembly as defined in claim 26 wherein said detent structure includes at least one depression in said floor to define a first switch position and wherein said control member includes a second ball retaining member, a second spring, and a second ball extending into engagement with said detent structure for providing a detent for said switch.

33. The switch assembly as defined in claim 26 wherein three conductors are mounted to said floor to define three switch contacts.

34. The switch assembly as defined in claim 33 wherein one of said switch contacts defines a track having a length for holding said movable contact element therein when said control member is in a first position.

35. The switch assembly as defined in claim 34 wherein a second one of said switch contacts defines in cooperation with said first switch contact tracks which receive said movable contact element when said control member is in a second position.

36. The switch assembly as defined in claim 35 wherein a third one of said switch contacts defines in cooperation with said second switch contact tracks which receive said movable contact element when said control member is in a third position.

37. The vehicle lamp switch assembly as defined in claim 26 wherein said raised floor section includes portions located on opposite sides of said detent structure.

38. The vehicle lamp switch assembly as defined in claim 26 wherein said bearing surfaces include a guide slot.

39. The vehicle lamp switch assembly as defined in claim 26 including snap-locking fasteners for retaining said control member to said housing.

* * * * *